(12) United States Patent
Beaumont

(10) Patent No.: US 7,373,645 B2
(45) Date of Patent: *May 13, 2008

(54) METHOD FOR USING EXTREMA TO LOAD BALANCE A LOOP OF PARALLEL PROCESSING ELEMENTS

(75) Inventor: Mark Beaumont, Reading (GB)

(73) Assignee: Micron Technology, Inc., Boise, ID (US)

(*) Notice: Subject to any disclaimer, the term of this patent is extended or adjusted under 35 U.S.C. 154(b) by 836 days.

This patent is subject to a terminal disclaimer.

(21) Appl. No.: 10/689,312

(22) Filed: Oct. 20, 2003

(65) Prior Publication Data

US 2004/0216115 A1 Oct. 28, 2004

(30) Foreign Application Priority Data

Apr. 23, 2003 (GB) ................... 0309209.5

(51) Int. Cl.
*G06F 9/46* (2006.01)
(52) U.S. Cl. ..................................... 718/105
(58) Field of Classification Search ................ 709/225; 395/675; 718/105
See application file for complete search history.

(56) References Cited

U.S. PATENT DOCUMENTS

| | | | |
|---|---|---|---|
| 5,241,677 A | 8/1993 | Naganuma et al. |
| 5,535,387 A | 7/1996 | Matsuoka et al. |
| 5,581,773 A | 12/1996 | Glover |
| 5,630,129 A | 5/1997 | Wheat |
| 5,850,489 A | 12/1998 | Rich |
| 5,892,517 A | 4/1999 | Rich |
| 5,966,528 A | 10/1999 | Wilkinson et al. |
| 6,078,945 A | 6/2000 | Hinsley |
| 6,219,776 B1 | 4/2001 | Pechanek et al. |

(Continued)

FOREIGN PATENT DOCUMENTS

WO WO 01/088696 A3 11/2001

OTHER PUBLICATIONS

Daehyun Kim, Mainak Chaudhuri, and Mark Heinrich, Leveraging Cache Coherence in Active Memory Systems, Proceedings of the 16th ACM.

(Continued)

*Primary Examiner*—Meng-Al T. An
*Assistant Examiner*—Eric C. Wai
(74) *Attorney, Agent, or Firm*—Edward L. Pencoske; Jones Day

(57) ABSTRACT

A method for balancing the load of a parallel processing system having a plurality of parallel processing elements arranged in a loop, each processing element ($PE_r$) having a local number of tasks associated therewith, wherein r represents the number for a selected processing element and each of the processing elements is operable to communicate with a clockwise and an anti-clockwise adjacent processing element, the method comprises determining a total number of tasks present within the loop, calculating a local mean number of tasks for each processing element, calculating a local deviation for each processing element, determining a running partial deviation sum for each processing element, determining a clockwise transfer parameter and an anti-clockwise transfer parameter for each processing element, and redistributing tasks among the processing elements in response to the clockwise transfer parameter and the anti-clockwise parameter for each of the processing elements.

20 Claims, 6 Drawing Sheets

U.S. PATENT DOCUMENTS

| | | |
|---|---|---|
| 6,279,088 B1 | 8/2001 | Elliot et al. |
| 6,292,822 B1 | 9/2001 | Hardwick |
| 6,404,439 B1 | 6/2002 | Coulombe et al. |
| 6,421,772 B1 | 7/2002 | Maeda et al. |
| 6,430,618 B1 | 8/2002 | Karger et al. |
| 2004/0024874 A1* | 2/2004 | Smith .......................... 709/225 |

OTHER PUBLICATIONS

Mainak Chaudhuri, Daehyun Kim, and Mark Heinrich, Cache Coherence Protocol Design for Active Memory Systems, Proceedings of the 2002.

* cited by examiner

METHOD FOR USING EXTREMA TO LOAD BALANCE A LOOP OF PARALLEL PROCESSING ELEMENTS

CROSS-REFERENCE TO RELATED APPLICATIONS

The present application is related to U.S. patent application Ser. No. 10/689,336 entitled "Method for Load Balancing a Loop of Parallel Processing Elements" filed 20 Oct. 2003, U.S. patent application Ser. No. 10/689,355 entitled "Method for Using Filtering to Load Balance a Loop of Parallel Processing Elements" filed 20 Oct. 2003, U.S. patent application Ser. No. 10/689,345 entitled "Method for Load Balancing a Line of Parallel Processing Elements" filed 20 Oct. 2003, U.S. patent application Ser. No. 10/689,365 entitled "Method for Load Balancing an N-Dimensional Array of Parallel Processing Elements" filed 20 Oct. 2003, U.S. patent application Ser. No. 10/689,382 entitled "Method for Rounding Values for a Plurality of Parallel Processing Elements" filed 20 Oct. 2003, and U.S. patent application Ser. No. 10/689,280 entitled "Method of Obtaining Interleave Interval for Two Data Values" filed 20 Oct. 2003.

BACKGROUND OF THE INVENTION

The present invention relates generally to parallel processing and more particularly to balancing the work loads of the processing elements within a parallel processing system.

Conventional central processing units ("CPU's"), such as those found in most personal computers, execute a single program (or instruction stream) and operate on a single stream of data. For example, the CPU fetches its program and data from a random access memory ("RAM"), manipulates the data in accordance with the program instructions, and writes the results back sequentially. There is a single stream of instructions and a single stream of data (note: a single operation may operate on more than one data item, as in X=Y+Z, however, only a single stream of results is produced). Although the CPU may determine the sequence of instructions executed in the program itself, only one operation can be completed at a time. Because conventional CPUs execute a single program (or instruction stream) and operate on a single stream of data, conventional CPUs may be referred to as a single-instruction, single data CPU or an SISD CPU.

The speed of conventional CPUs has dramatically increased in recent years. Additionally, the use of cache memories enables conventional CPUs faster access to the desired instruction and data streams. However because conventional CPUs can complete only one operation at a time, conventional CPUs are not suitable for extremely demanding applications having large data sets (such as moving image processing, high quality speech recognition, and analytical modeling applications, among others).

Improved performance over conventional SISD CPUs may be achieved by building systems which exhibit parallel processing capability. Typically, parallel processing systems use multiple processing units or processing elements to simultaneously perform one or more tasks on one or more data streams. For example in one class of parallel processing system, the results of an operation from a first CPU are passed to a second CPU for additional processing, and from the second CPU to another CPU, and so on. Such a system, commonly known as a "pipeline", is referred to as a multiple-instruction, single-data or MISD system because each CPU receives a different instruction stream while operating on a single data stream. Improved performance may also be obtained by using a system which contains many autonomous processors, each running its own program (even if the program running on the processors is the same code) and producing multiple data streams. Systems in this class are referred to as a multiple-instruction, multiple-data or MIMD system.

Additionally, improved performance may be obtained using a system which has multiple identical processing units each performing the same operations at once on different data streams. The processing units may be under the control of a single sequencer running a single program. Systems in this class are referred to as a single-instruction, multiple data or SIMD system. When the number of processing units in this type of system is very large (e.g., hundreds or thousands), the system may be referred to as a massively parallel SIMD system.

Nearly all computer systems now exhibit some aspect of one or more of these types of parallelism. For example, MMX extensions are SIMD; multiple processors (graphics processors, etc) are MIMD; pipelining (especially in graphics accelerators) is MISD. Furthermore, techniques such as out of order execution and multiple execution units have been used to introduce parallelism within conventional CPUs as well.

Parallel processing is also used in active memory applications. An active memory refers to a memory device having a processing resource distributed throughout the memory structure. The processing resource is most often partitioned into many similar processing elements (PEs) and is typically a highly parallel computer system. By distributing the processing resource throughout the memory system, an active memory is able to exploit the very high data bandwidths available inside a memory system. Another advantage of active memory is that data can be processed "on-chip" without the need to transmit the data across a system bus to the CPU or other system resource. Thus, the work load of the CPU may be reduced to operating system tasks, such as scheduling processes and allocating system resources.

A typical active memory includes a number of interconnected PEs which are capable of simultaneously executing instructions sent from a central sequencer or control unit. The PEs may be connected in a variety of different arrangements depending on the design requirements for the active memory. For example, PEs may be arranged in hypercubes, butterfly networks, one-dimensional strings/loops, and two-dimensional meshes, among others.

In typical active memories, load imbalances often occur such that some PEs are idle (i.e., without assigned tasks) while other PEs have multiple tasks assigned. To maximize the effectiveness of the active memory, it is desirable to balance the work load across all of the PEs. For example in an active memory having a multitude of identical PEs, it is desirable that each PE be assigned the same number of instructions by the central sequencer, thus maximizing the resources of the active memory. Additionally in an active memory having non-identical PEs, it may be desirable to assign more tasks to the PEs with greater processing capabilities. By balancing the load, the amount of time that one or more PEs is idle while waiting for one or more other PEs to complete their assigned tasks is minimized.

Thus, there exists a need for a method for balancing the load of a parallel processing system such that the resources of the parallel processing system are maximized. More specifically, there exists a need for a method for balancing the load of an active memory such that the resources of the active memory are maximized.

SUMMARY OF THE INVENTION

One aspect of the present invention relates to a method for balancing the load of a parallel processing system having a plurality of parallel processing elements arranged in a loop, wherein each processing element ($PE_r$) has a local number of tasks associated therewith, wherein r represents the number for a selected processing element, and wherein each of the processing elements is operable to communicate with a clockwise adjacent processing element and with an anti-clockwise adjacent processing element. The method comprises determining a total number of tasks present within the loop, calculating a local mean number of tasks for each of the plurality of processing elements, calculating a local deviation for each of the plurality of processing elements, determining a running partial deviation sum for each of the plurality of processing elements, determining a clockwise transfer parameter and an anti-clockwise transfer parameter for each of the plurality of processing elements, and redistributing tasks among the plurality of processing elements in response to the clockwise transfer parameter and the anti-clockwise parameter for each of the plurality of processing elements.

Another aspect of the present invention relates to a method for reassigning tasks associated with a selected processing element within a parallel processing system having a plurality of processing elements connected in a loop, each of the plurality of processing elements having a local number of tasks associated therewith. The method comprises determining the total number of tasks on the loop, computing a local mean value for the selected processing element, computing a local deviation for the selected processing element, the local deviation representative of the difference between the local number of tasks for the selected processing element and the local mean value for the selected processing element, determining a running partial deviation sum for the selected processing element, computing a number of tasks to transfer in a clockwise direction for the selected processing element, computing a number of tasks to transfer in an anti-clockwise direction for the selected processing element, and reassigning the tasks associated with the selected processing element relative to the number of tasks to transfer in a clockwise direction and the number of task to transfer in an anti-clockwise direction.

The present invention enables tasks to be distributed along a group of serially connected PEs so that each PE typically has X number of tasks or (X+1) number of tasks to perform in the next phase. The present invention may be performed using the hardware and software (i.e., the local processing capability) of each PE within the array. Those advantages and benefits, and others, will become apparent from description of the invention below.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION OF THE INVENTION

As discussed above, parallel processing systems may be placed within one or more classifications (e.g., MISD, MIMD, SIMD, etc.). For simplicity, the present invention is discussed in the context of a SIMD parallel processing system. More specifically, the present invention is discussed in the context of a SIMD active memory. It should be noted that such discussion is for clarity only and is not intended to the limit the scope of the present invention in any way. The present invention may be used for other types and classifications of parallel processing systems.

Figure 1:
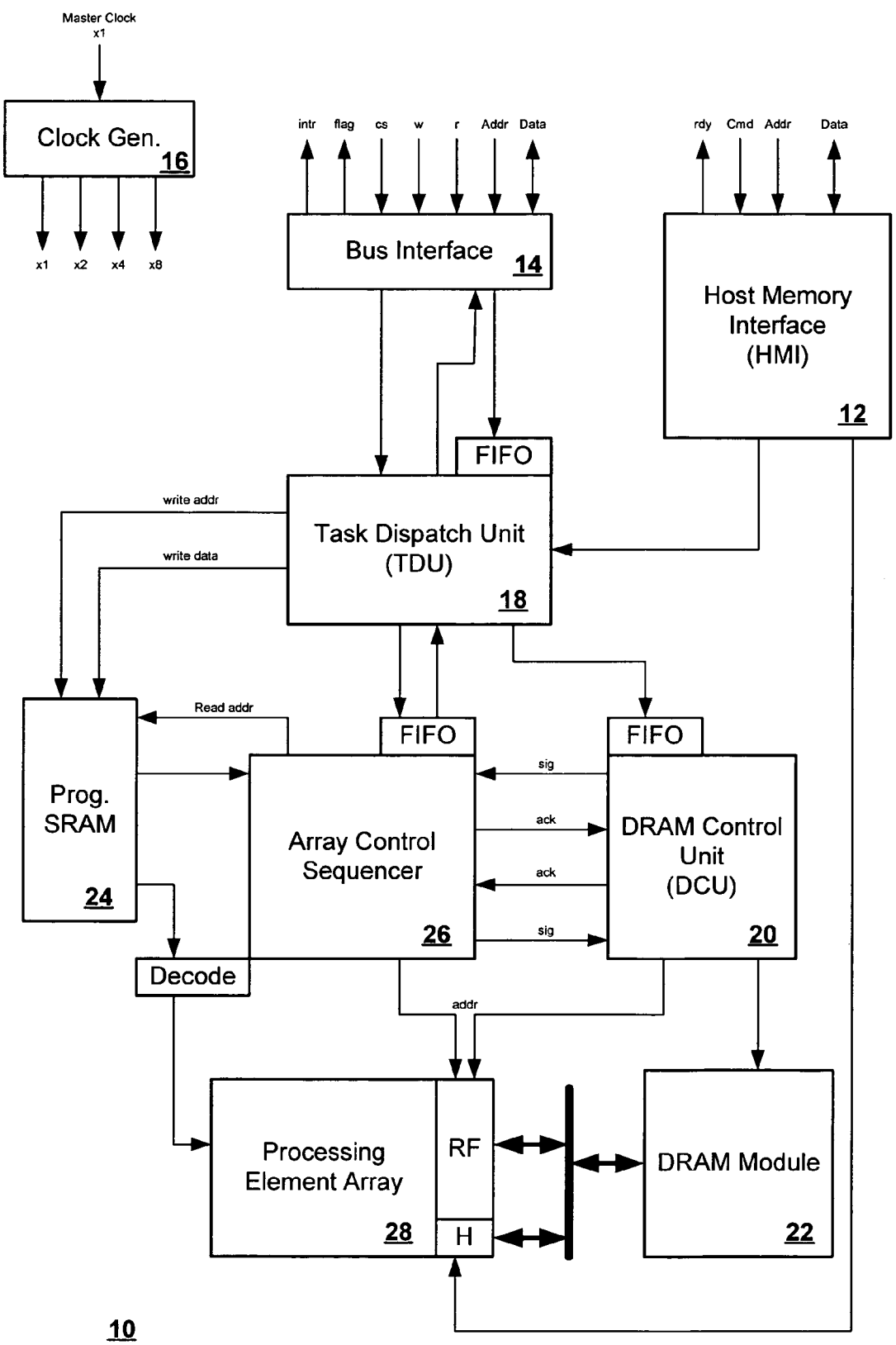
FIG. 1 is a block diagram illustrating an active memory according to an embodiment of the present invention.

FIG. 1 is a block diagram illustrating an active memory 10 according to an embodiment of the present invention. It should be noted that the active memory 10 is only one example of a device on which the methods of the present invention may be practiced and those of ordinary skill in the art will recognize that the block diagram of FIG. 1 is an overview of an active memory device 10 with a number of components known in the art being omitted for purposes of clarity.

Active memory 10 is intended to be one component in a computer system. Processing within active memory 10 is initiated when the active memory 10 receives commands from a host processor (not shown), such as the computer system's CPU. A complete processing operation (i.e., data movement and processing) in the active memory 10 may consist of a sequence of many commands from the host to the active memory device 10.

Active memory 10 is comprised of a host memory interface ("HMI") 12, a bus interface 14, a clock generator 16, a task dispatch unit ("TDU") 18, a DRAM control unit ("DCU") 20, a DRAM module 22, a programmable SRAM 24, an array control sequencer 26, and a processing element array 28, among others.

The HMI 12 provides an input/output channel between the host (such as a CPU, not shown) and the DRAM module 22. In the current embodiment, the HMI 12 receives command (cmd), address (addr), and data signals (among others) from and sends data and ready (rdy) signals (among others) to the host. The HMI 12 approximates the operation of a standard non-active memory so that the host, without modifications, is compatible with the active memory 10.

The HMI 12 may be similar in its operation to the interface of a synchronous DRAM as is know in the art. Accordingly, the host must first activate a page of data to access data within a DRAM module 22. In the current embodiment, each page may contain 1024 bytes of data and there may be 16,384 pages in all. Once a page has been activated, it can be written and read through the HMI 12. The data in the DRAM module 22 may be updated when the page is deactivated. The HMI 12 also sends control signals (among others) to the DCU 20 and to the processing element array 28 via the task dispatch unit 18.

The HMI 12 may operate at a frequency different than that of the frequency of the master clock. For example, a 2× internal clock signal from clock generator 16 may be used. Unlike a traditional DRAM, the access time for the HMI 12 uses a variable number of cycles to complete an internal operation, such as an activate or deactivate. Thus the ready signal (rdy) is provided to allow the host to detect when a specific command has been completed.

The bus interface 14 provides and input/output channel between the host and the TDU 18. For example, the bus interface 14 receives column select (cs), write command (w), read command (r), address (addr), and data signals (among others) from and places interrupt (intr), flag, and data signals (among others) onto the system bus (not shown). The bus interface 14 also receives signals from and sends signals to TDU 18.

The clock generator 16 is operable to receive an external master clock signal (x1) and operable to provide the master clock signal (x1) and one or more internal clock signals (x2, x4, x8) to the components of the active memory. It should be apparent to one skilled in the art that other internal clock signals may be produced by the clock generator 16.

The TDU 18 communicates with the bus interface 14, the HMI 12, the programmable SRAM 24, the array control sequencer 26, and the DCU 20. In the current embodiment, the TDU 18 functions as an interface to allow the host to issue a sequence of commands to the array control sequencer 26 and the DCU 20. Task commands from the host may be buffered in the TDU's FIFO buffers to allow a burst command to be issued. Commands may contain information on how the tasks in the array control sequencer 26 and the DCU 20 should be synchronized with one another, among others.

The DCU 20 arbitrates between the TDU 18 and the HMI 12 and sends commands to the DRAM modules 22 and the processing element array 28. The DCU 20 also schedules refreshes within the DRAM modules 22. In one embodiment, the DRAM modules 22 of the active memory 10 may be comprised of sixteen 64 k×128 eDRAM (or embedded DRAM) cores. Each eDRAM core may be connected to an array of sixteen PEs, thus providing 256 (16×16) PEs in all.

The programmable SRAM 24 functions as a program memory by storing commands issued by the TDU 18. For example, the TDU 18 may transmit a "write program memory address" command which sets up a start address for a write operation and a "write program memory data" command which writes a memory location and increments the program memory write address, among others. The programmable SRAM 24, in the current embodiment, has both an address register and a data output register.

The array control sequencer 26 may be comprised of a simple 16 bit minimal instruction set computer (16-MISC). The array control sequencer 26 communicates with the TDU 18, the programmable SRAM 24, and the DCU 20, and is operable to generate register file addresses for the processing element array 28 and operable to sequence the array commands, among others.

The processing element array 28 is comprised of a multitude of processing elements ("PEs") 30 (see FIG. 2) connected in a variety of different arrangements depending on the design requirements for the processing system. For example, processing units may be arranged in hypercubes, butterfly networks, one-dimensional strings/loops, and two-dimensional meshes, among others. In the current embodiment, the processing elements 30 are arranged in a loop (for example, see FIG. 3). The processing element array 28 communicates with the DRAM module 22 and executes commands received from the programmable SRAM 24, the array control sequencer 26, the DCU 20, and the HMI 12. Each PE in the processing element array 28 includes dedicated H-registers for communication with the HMI 12. Control of the H-registers is shared by the HMI 12 and the DCU 20.

Figure 2:
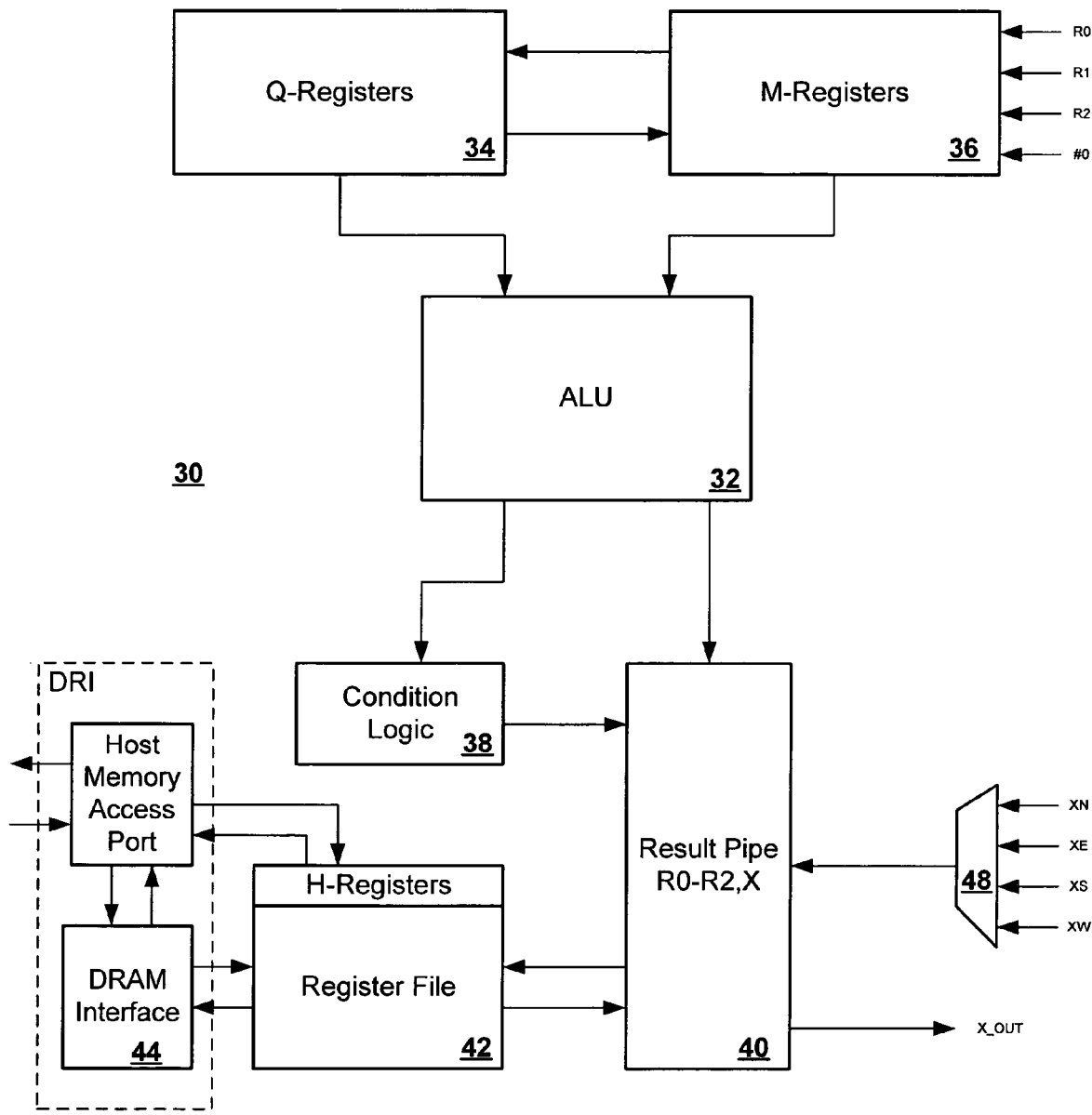
FIG. 2 is a block diagram of a processing element for the active memory as illustrated in FIG. 1 according to an embodiment of the present invention.

Referring now to FIG. 2, a block diagram of a PE 30 according to one embodiment of the present invention is illustrated. PE 30 includes an arithmetic logic unit ("ALU") 32, Q-registers 34, M-registers 36, a shift control and condition register 38 (also called "condition logic" 38), a result register pipeline 40, and register file 42. The PE 30 may also contain other components such as multiplexers 48 and logic gates (not shown), among others.

In the current embodiment, the Q-registers 34 are operable to merge data into a floating point format and the M-Registers 36 are operable to de-merge data from a floating point format into a single magnitude plus an exponent format. The ALU 32 is a multiplier-adder operable (among others) to receive information from the Q-registers 34 and M-registers 36, execute tasks assigned by the TDU 18 (see FIG. 1), and transmit results to the shift control and condition logic 38 and to the result register pipeline 40. The result register pipeline 40 is operable to communicate with the register file 42, which holds data for transfer into or out of the DRAM modules 22 via a DRAM interface 44. Data is transferred between the PE and the DRAM module 22 via a pair a registers, one register being responsive to the DCU 20 and the other register being responsive to the PE 30. The DRAM interface receives command information from the DCU 20. The DRAM interface 44 also permits the PE 30 to communicate with the host through the host memory access port 46.

In the current embodiment, the H-registers 42 are comprised of synchronous SRAM and each processing element within the processing element array 28 contains eight H-registers 42 so that two pages can be stored from different DRAM locations, thus allowing the interleaving of short i/o bursts to be more efficient. Result register pipeline 40 is also connected to one or more neighborhood connection registers ("X-register") (not shown). The X-register links one PE 30 to its neighboring PE's 30 in the processing element array 28.

The reader desiring more information about the hardware shown in FIGS. 1 and 2 is directed to UK Patent application 0221563.0 entitled "Control of Processing Elements in Parallel Processors" filed 17 Sep. 2002, which is hereby incorporated by reference. Details about the PEs may also be found in UK Patent Application No. 021562.2 entitled "Host Memory Interface for a Parallel Processor" filed 17 Sep. 2002, which is hereby incorporated by reference.

Figure 3:
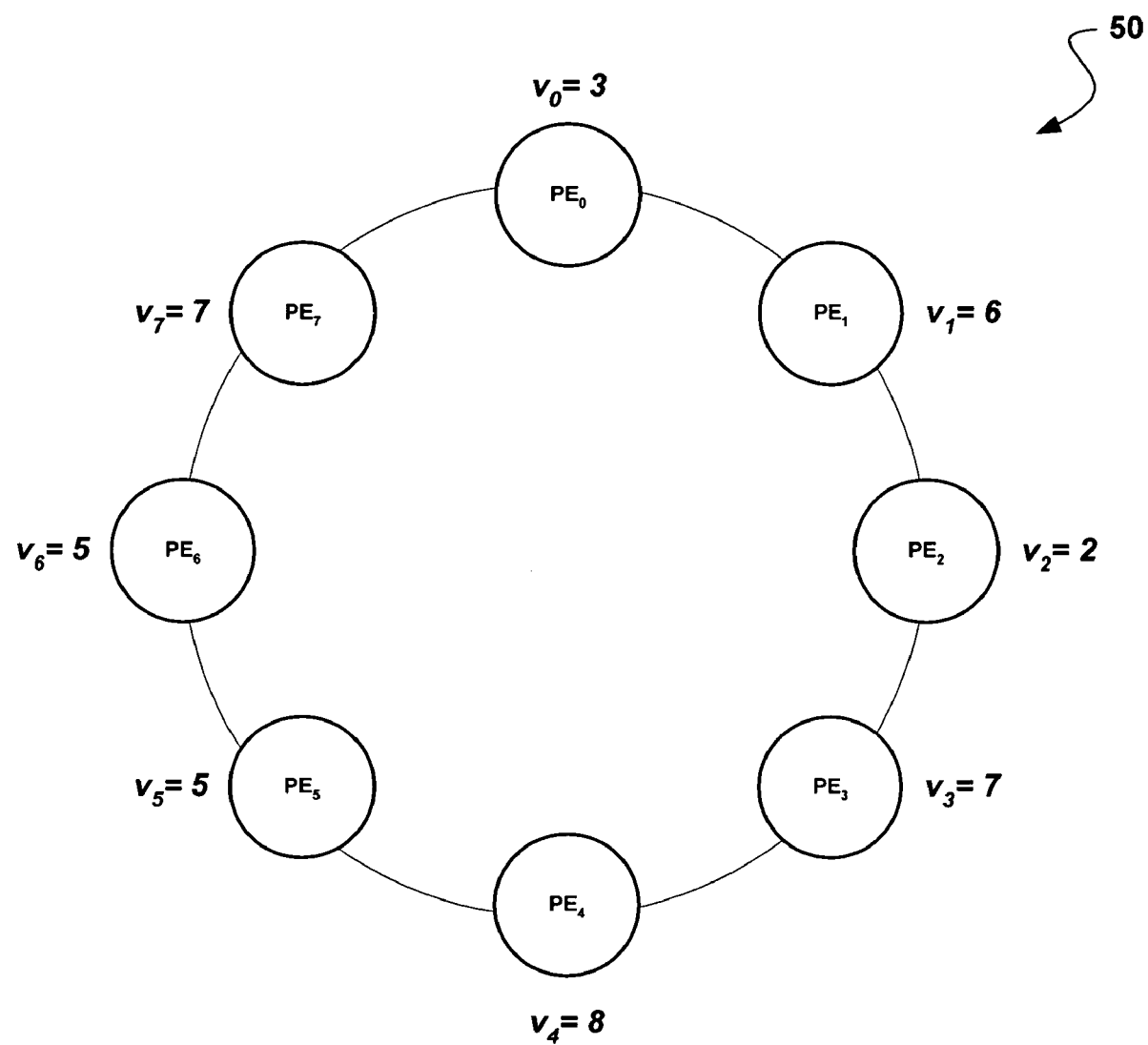
FIG. 3 illustrates an array of the processing elements as illustrated in FIG. 2 arranged in a loop according to an embodiment of the present invention.

FIG. 3 is a simplified diagram showing the interconnections of an array of the processing elements 30 (as illustrated in FIG. 2) arranged in a loop 50 according to an embodiment of the present invention. In the current embodiment, loop 50 is comprised of eight (8) PEs 30 (i.e., $PE_0$, $PE_1$, ... $PE_7$) which are interconnected via their associated X-register links. It should be noted that the number of PEs 30 included in loop 50 may be altered while remaining within the scope of the present invention. As illustrated in FIG. 3, each PE is operable to communicate with its clockwise and anti-clockwise neighbor. For example, $PE_r$ is operable to communicate with its clockwise neighbor, $PE_2$, and with its anti-clockwise neighbor, $PE_0$. In the current embodiment, every PE 30 on the loop 50 receives instructions from a single TDU 18 as discussed in conjunction with FIG. 1. Furthermore, each PE has a local number of tasks ($v_r$) associated therewith. For example, $PE_0$ has three (3) tasks associated therewith (i.e., $v_0=3$), $PE_1$ has six (6) tasks associated therewith (i.e., $v_1=6$), $PE_2$ has two (2) tasks associated therewith (i.e., $v_2=2$), etc.

Figure 4:
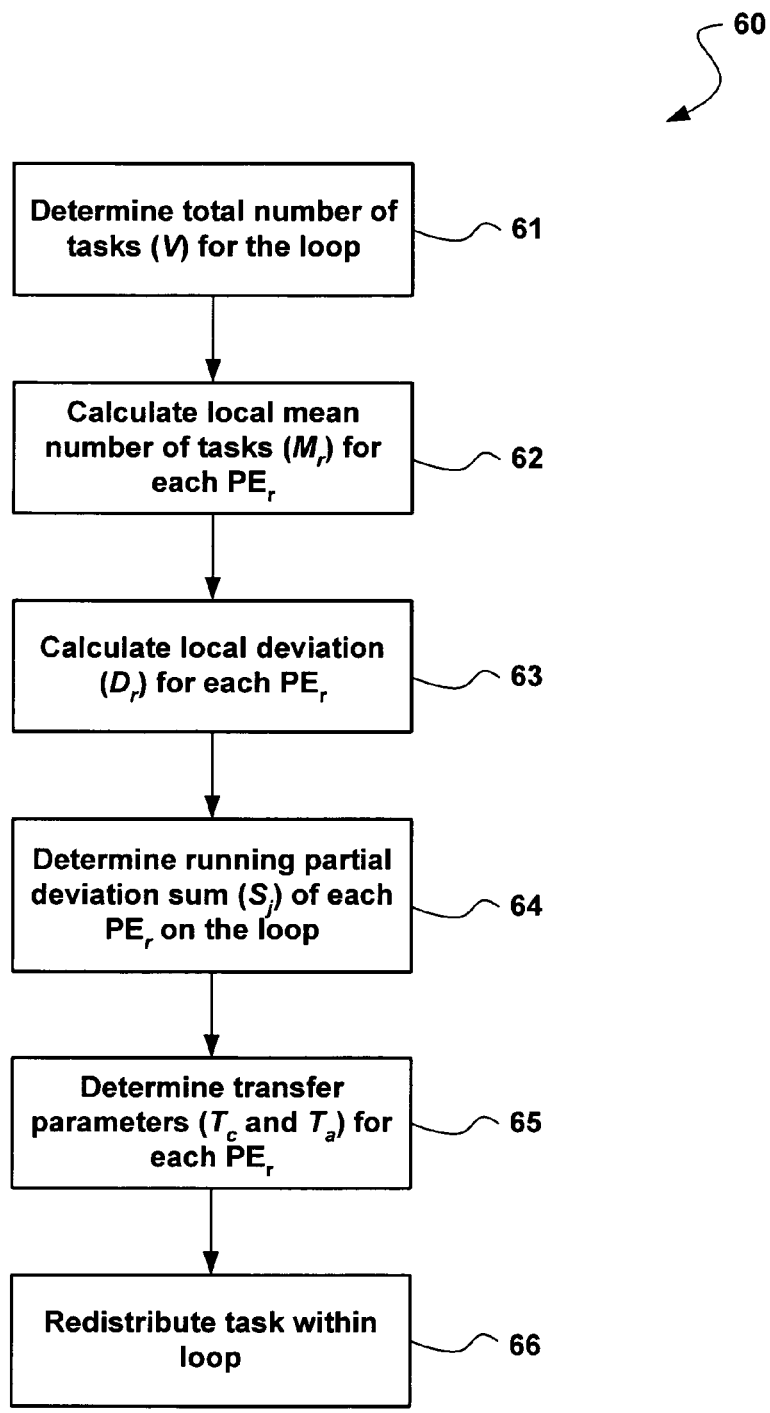
FIG. 4 illustrates an operational process for balancing the load within a loop of processing elements according to an embodiment of the present invention.

FIG. 4 illustrates an operational process 60 for balancing the work load between the PEs 30 on loop 50 according to an embodiment of the present invention. Operational process 60 begins by determining the total number of tasks (V) present on the loop in operation 61. As discussed above in conjunction with FIG. 3, each $PE_r$ (where r=0 to 7, e.g., $PE_0$, $PE_1$, ... $PE_7$) in the loop has a local number of tasks ($v_r$) associated therewith. In the current embodiment, each $PE_r$ passes its own value $v_r$ onto its anti-clockwise neighbor and simultaneously receives a value $v_{r+1}$ from its clockwise neighbor. Each $PE_r$ keeps a running partial sum (i.e., adds each value $v_{r+1}$ received to its own value $v_r$). This process continues until each value $v_r$ has moved anti-clockwise around the loop and visited each $PE_r$, in this case seven transfers are needed. At the end of the rotation process, the sum represents the total number of tasks (V) on the loop.

The sum (V) can be expressed by the equation $$V = \sum_{i=0}^{i=N-1} v_i,$$

where N represents the number of PEs 30 in the loop 50 (here N=8), and $v_i$ represents the local number of tasks associated with an $i^{th}$ processing element in the loop. For example, for i=3, the number of tasks associated with $PE_3$ (i.e., $v_3$) is added to the sum V. It should be noted that after a rotation is completed, each $PE_r$ will have calculated the same value for (V). It should also be noted in the current discussion, "local" refers to the values or functions associated with a single PE within the loop, whereas "global" refers to the values or function associated with the entire loop of PEs.

After the total number of tasks (V) present on the loop is determined in operation 61, the local mean number ($M_r$) of tasks for each $PE_r$ is computed in operation 62. In the current embodiment, operation 62 employs a rounding function to ensure that no tasks are lost or "gained" during the rounding process (i.e., to ensure that (i.e., to ensure that $V = \sum_{i=0}^{i=N-1} M_i$).

For example assume that 13 tasks (i.e., V=13) are to be shared by the eight PEs (i.e., $PE_0$ through $PE_7$). Without the rounding function, the local mean for each PE would be $PE_r$=1.625 before rounding (i.e., 13÷8=1.625). If the fraction thirteen-eighths is set to round down for each PE (i.e., 13÷8=1), then the sum of the means for all of the individual PEs (i.e., $PE_0$ through $PE_7$) is equal to eight (8) and five tasks (13÷8=5) are lost. In contrast, if the fraction thirteen-eighths is set to round up for each PE (i.e., 13÷8=2), then the sum of the means for all of the individual PEs (i.e., $PE_0$ through $PE_7$) is equal to sixteen (16) and three extra tasks (16−13=3) are gained.

In the current embodiment, the rounding function $M_r$=Trunc((V +$E_r$) lN) is employed, which prevents tasks from being lost or gained (where $M_r$ represents the local mean for $PE_r$, N represents the total number of PEs 30 in the loop 50, and $E_r$ represents a number in the range of 0 to (N−1)). The rounding function used by the current embodiment is discussed in more detail in U.S. patent application Ser. No. 10/689,382 entitled "Rounding Algorithm for a Plurality of Parallel Processing Elements" filed Oct. 20, 2003 and incorporated in its entirety by reference herein.

In the current embodiment, each PE is assigned a different $E_r$ value for controlling the rounding. The simplest form for the function E is the case in which $E_r$=$P_r$, where $P_r$ represents the PEs position in the loop. For example, for $PE_0$, $E_0$=0; for $PE_1$, $E_1$=1; for $PE_2$, $E_2$=2; etc. By assigning each PE in the loop a different $E_r$ value, the rounding function can be controlled such that some of the local means are rounded up and some of the local means are rounded down, thus insuring that $$V = \sum_{i=0}^{i=N-1} M_i.$$

It should be noted that in the current embodiment, the local mean for each PE 30 in the loop is computed in parallel with the local means of the other PEs in the loop.

Table 1 illustrates the local mean calculation for the loop 50 as illustrated in FIG. 3 in which the total number of tasks on the loop is equal to forty-three (43). Referring to Table 1, it is apparent that the rounding function controls the rounding such that $M_0$ through $M_4$ are all rounded to five (5), whereas $M_5$ through $M_7$ are all rounded to six (6). The sum of the values of $M_0$ through $M_7$ is equal to forty-three (43), which equals the total number of tasks (V) on the loop. Thus, tasks are neither lost nor gained due to rounding.

TABLE #1

Local Mean Calculation for the Loop 50 (V = 43, N = 8).

| $PE_r$ | $v_r$ | $E_r$ | $(V + E_r)/N$ | $M_r$ = Trunc$((V + E_r)/N)$ | $D_r$ |
|---|---|---|---|---|---|
| $PE_0$ | 3 | 0 | 5.375 | 5 | −2 |
| $PE_1$ | 6 | 1 | 5.5 | 5 | 1 |
| $PE_2$ | 2 | 2 | 5.625 | 5 | −3 |
| $PE_3$ | 7 | 3 | 5.75 | 5 | 2 |
| $PE_4$ | 8 | 4 | 5.875 | 5 | 3 |
| $PE_5$ | 5 | 5 | 6.0 | 6 | −1 |
| $PE_6$ | 5 | 6 | 6.125 | 6 | −1 |
| $PE_7$ | 7 | 7 | 6.25 | 6 | 1 |

After the local means are computed in operation 62, the local deviation $D_r$ is calculated for each $PE_r$ in operation 63. In the current embodiment, the local deviation is for $PE_r$ is simply the difference between the local number of tasks and the local mean (i.e., $D_r$=$v_r$−$M_r$). The local deviations $D_r$ for $PE_0$ through $PE_7$ are illustrated in Table #1.

After the local deviations are computed in operation 63, a running partial deviation sum ($S_j$) is determined for each $PE_r$ in operation 64. The partial deviation sum ($S_j$) is formed in a similar manner as that used to form the partial value sum (V) in operation 61. In operation 64, however, the local deviations ($D_r$) are summed instead of the local number of tasks ($v_r$). If "j" deviations have been moved around the loop, then the partial deviation sum ($S_j$) can be represented by the equation:

$$S_j = \sum_{i=0}^{i=j} D_i.$$

It should be noted that the sum of the deviations of all the PEs on the loop 50 is zero (i.e., $S_{N-1}=0$). In other words, if $j=(N-1)$, then $S_j=0$. Referring to Table #1 for example, the partial deviation sum relative to $PE_0$ where $j=(N-1)$ (i.e., $S_{N-1}$) is $D_0+D_1+D_2+D_3+D_4+D_5+D_6+D_7=(-2)+1+(-3)+2+3+(-1)+(-1)+1=0$. In general however, the local partial deviation sum ($S_j$) will be different for each $PE_r$ if $j\neq(N-1)$. Referring to Table #1 for example, the partial deviation sum relative to $PE_1$ where $j=3$ (i.e., $S_3$) is $D_1+D_2+D_3+D_4=1+(-3)+2+3=3$. Whereas, the partial deviation sum relative to $PE_4$ where $j=3$ (i.e., $S_3$) is $D_4+D_5+D_6+D_7=3+(-1)+(-1)+1=2$.

After a running partial deviation sum ($S_j$) is determined for each $PE_r$ in operation 64, an anti-clockwise transfer parameter ($T_a$) and a clockwise transfer parameter ($T_c$) are determined for each $PE_r$ in operation 65. In the current embodiment, each $PE_r$ keeps a record of the highest ($H_r$) and lowest ($L_r$) sums ($S_j$) encountered in operation 64. The highest ($H_r$) and lowest ($L_r$) sums ($S_j$) may be referred to as extrema and are generally different for each $PE_r$ even after all deviations have been summed. Each $PE_r$ determines its own transfer parameters from the local ($H_r$) and local ($L_r$) values. For example in the current embodiment, the anti-clockwise transfer parameter ($T_a$) and the clockwise transfer parameter ($T_c$) are determined using the equations $T_a=(H_r+L_r)\div 2$ and $T_c=D-T_a$, respectively.

Figure 5:
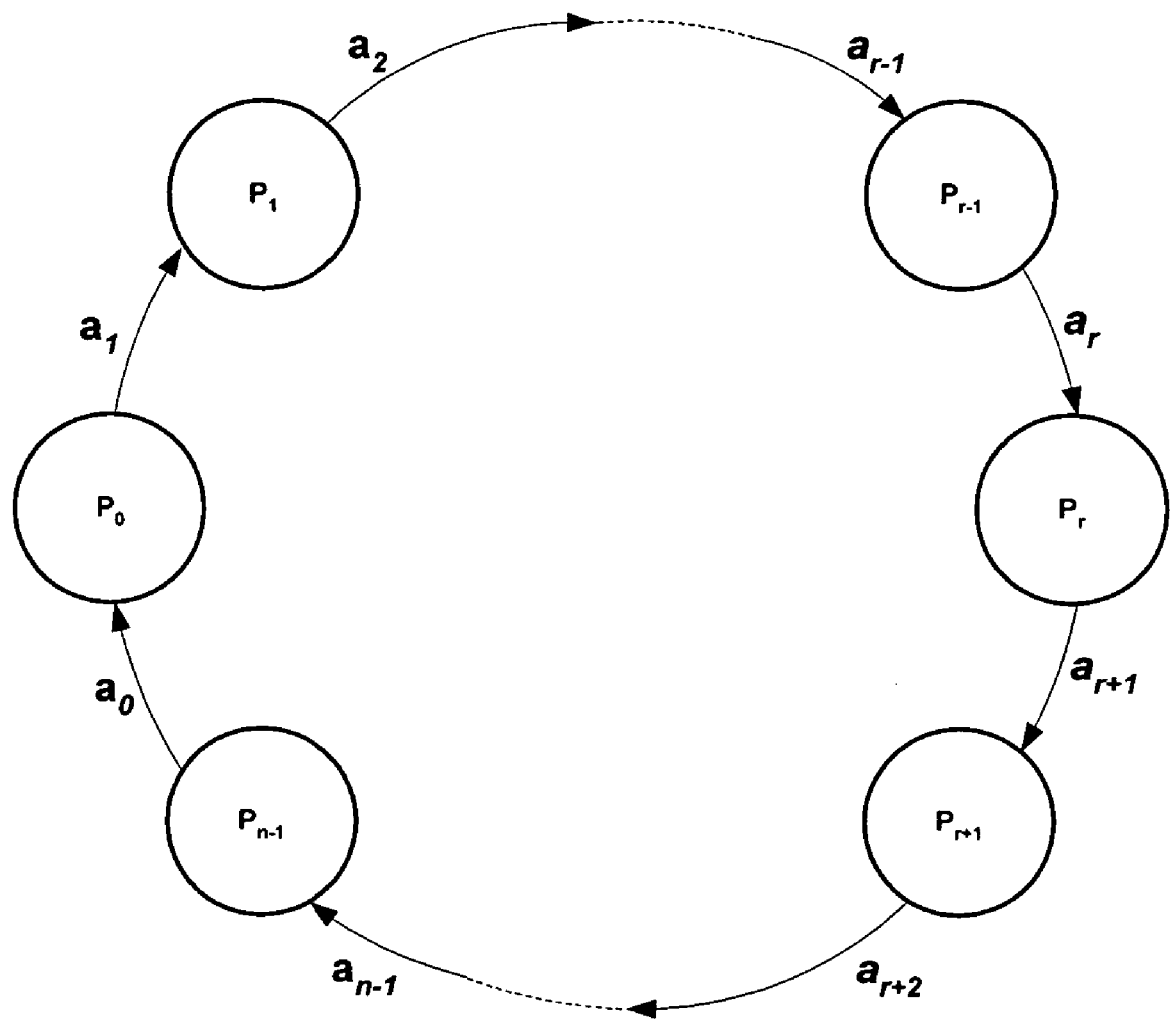
FIGS. 5 and 6 illustrate the relationship between transfer rates around a loop of processing elements and a local transfer rate according to an embodiment of the present invention.
Figure 6:
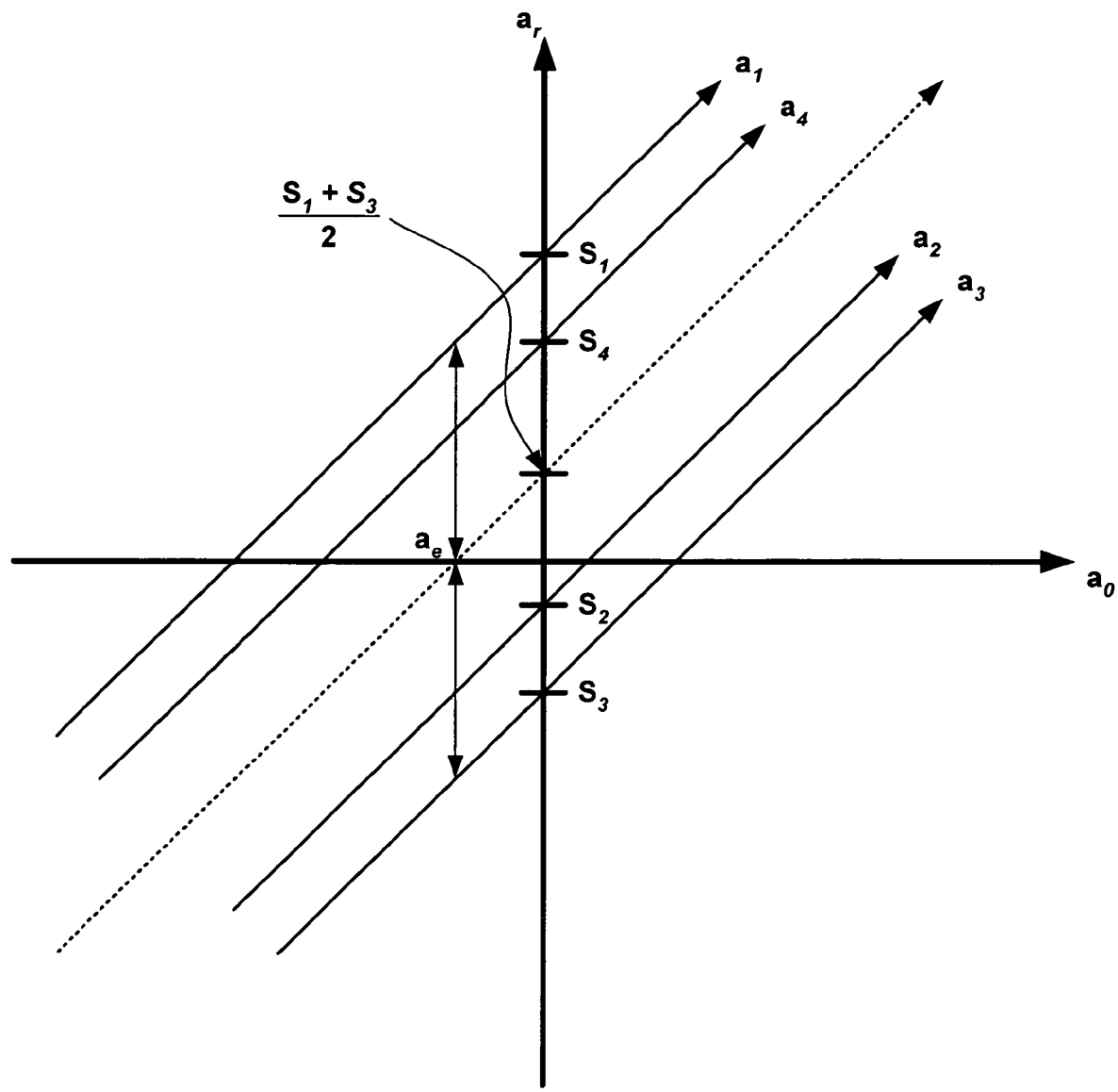

Referring to FIGS. 5 and 6, $PE_r$ has an initial deviation of $P_r$ and $a_r$ is the number of tasks received clockwise from $PE_{r-1}$ (situated immediately clockwise) and $a_{r+1}$ is the number of tasks sent out by $PE_r$ in a clockwise direction. After the transfer of these tasks, all PEs will have zero deviation. Thus, $P_r+a_r-a_{r+1}=0$ for all $0\leq r<n$. Furthermore, $a_1=a_0+P_0$; $a_2=a_1+P_1$; $a_3=a_2+P_2$; . . . etc. Thus, the general equation $$a_r = a_0 + \sum_{i=0}^{i=r-1} P_i$$

may be derived.

As the values $P_i$ are moved around the loop each $PE_r$ can evaluate its local version of general equation above. Each $PE_r$ will have (n−1) equations expressing $a_r$ in terms of $a_0$ and the partial sum of deviations. For example, $a_1=a_0+S_1$; $a_2=a_0+S_2$; $a_3=a_0+P_3$; . . . $a_{n-31\ 1}=a_0+S_{n-1}$. For any given $PE_r$, the transfer rates for every step around the loop can be related to the local transfer value $a_0$. Referring to FIG. 6, the (n−1) equations for a given $PE_r$ may be plotted as a series of parallel lines. In order to minimize the transfer rates the value of $a_0$ is chosen to make the maximum positive excursion the same as the maximum negative excursion. This value is illustrated in FIG. 6 as $a_e$. Accordingly, the local transfer values are represented by the equations $a_0=a_e$ and $a_1=a_e+P_0$.

To find the actual value for $a_e$, it is apparent from FIG. 6 that the two extrema $H_r$ and $L_r$ (represented in FIG. 6 as $S_1$ and $S_3$, respectively) need to be determined. $H_r$ and $L_r$ may be referred to as MAX and MIN, respectively. Thus referring to FIG. 6, $$a_e = \frac{-(MAX + MIN)}{2}.$$

It should be noted that MAX and MIN are the maximum and minimum values of $$\sum_{i=0}^{i=r-1} P_i$$

and $$\sum_{i=0}^{i=r-1} P_i$$

as r moves from $r=0$ to $r=n-1$. As each $PE_r$ starts with a different value of $P_0$, the values for MAX, MIN, and $a_e$ will also be different for each $PE_r$. The values MAX and MIN can be updated "on-the-fly" as the deviations are moved round the loop and the sums are accumulated. Thus, the values obtained for $H_r$ and $L_r$ may be used to calculate the clockwise transfer parameter ($T_c$) and the anti-clockwise transfer parameter ($T_a$), where $T_a=-a_0$ and $T_c=a_1$.

It should be noted that the values obtained for $T_c$ and $T_a$ may need to be rounded in such a manner that $R(T_c)+R(T_a)=P_r$. In the current embodiment, tasks are transmitted in only one direction at a time around the loop (i.e., either in the clockwise or anti-clockwise direction). A direction is selected for the 'first' transmission around the loop and the values for $T_c$ and $T_a$ are rounded up in this direction. It should be noted that by ensuring 'excess traffic' is sent in the 'first' direction, the chance of the process finishing one step earlier is increased. In the current embodiment, tasks are transmitted in the anti-clockwise first, such that $R(T_a)=$Ceil$(T_a)$, where the 'Ceil' function returns the closest integer greater than or equal to the supplied input. To ensure that extra tasks are not created or lost by the rounding of $R(T_a)$, $R(T_c)$ is set equal $P_r-R(T_a)$.

It should be noted that other rounding mechanisms may be used while remaining within the scope of the present invention. For example, $T_c$ may be rounded up on odd numbered PE's and $T_a$ rounded up on even numbered PE's such that pairs of odd and even PE's exchange their 'excess traffic'.

In the case where the loop 50 is comprised of an odd number of PEs 30, an extra "phantom" PE may be used. The phantom PE is assigned a deviation of zero (0) and is located diametrically opposite from the perspective of the selected PE. For example, assume that $PE_7$ is removed from loop 50 such that only seven PEs remain (i.e., $PE_0$ to $PE_6$). To calculate the local deviation of $PE_0$, the phantom PE would be placed between $PE_3$ and $PE_4$; for $PE_1$, between $PE_4$ and $PE_5$; for $PE_2$, between $PE_5$ and $PE_6$, etc. Thus, the phantom PE is located in the loop 50 such that the number of PEs between the selected PE and the phantom PE in the clockwise direction is equal to the number of PEs between the selected PE and the phantom PE in the anti-clockwise direction.

After the clockwise transfer parameter ($T_c$) and the anti-clockwise transfer parameter ($T_a$) are determined for each $PE_r$ in operation 65, the tasks are redistributed among the PEs within the loop in response to the clockwise transfer and anti-clockwise transfer parameters ($T_c$ and $T_a$, respectively) in operation 66. In the current embodiment, a positive $T_c$ parameter represents the number of values that are to be transmitted clockwise out of the local PE. A negative $T_c$ parameter represents the number of values that are to be transmitted from the clockwise PE into the local PE. Similarly, a positive $T_a$ parameter represents the number of values that are to be transmitted anti-clockwise out of the local PE. A negative $T_a$ parameter represents the number of values that are to be transmitted from the anti-clockwise PE into the local PE.

If the local deviation (D) is negative, one or more of the received values will be "absorbed" by the local PE to make up the local deficit. The other will be transmitted, either from the clockwise PE to the anti-clockwise $PE_r$ or from the anti-clockwise PE to the clockwise PE. On occasion, some PEs may start off with no values at all, these PEs may have to "mark time" until they receive a value. It should be noted that after each successful transmission or receipt, the local parameters $T_c$ and $T_a$ need to be updated. The redistribution stage only terminates when $T_c=T_a=0$ for all PEs.

It should be recognized that the above-described embodiments of the invention are intended to be illustrative only. Numerous alternative embodiments may be devised by those skilled in the art without departing from the scope of the following claims.

What is claimed is:

1. A method for balancing the load of a parallel processing system having a plurality of parallel processing elements arranged in a loop, wherein each processing element ($PE_r$) has a local number of tasks associated therewith, wherein r represents the number for a selected processing element, and wherein each of said processing elements is operable to communicate with a clockwise adjacent processing element and with an anti-clockwise adjacent processing element, the method comprising:
   determining a total number of tasks present within said loop;
   calculating a local mean number of tasks for each of said plurality of processing elements;
   calculating a local deviation from said local mean number for each of said plurality of processing elements;
   determining a running partial deviation sum for each of said plurality of processing elements using said local deviation;
   determining a clockwise transfer parameter and an anti-clockwise transfer parameter for each of said plurality of processing elements from said running partial deviation sums; and
   redistributing tasks among said plurality of processing elements using said clockwise transfer parameter and said anti-clockwise parameter for each of said plurality of processing elements.

2. The method of claim 1 wherein said determining a total number of tasks present within said loop, comprises:
   transmitting said local number of tasks associated with each of said plurality of processing elements to each other of said plurality of processing elements within said loop;
   receiving within each of said plurality of processing elements said number of local tasks associated with said each other of said plurality of processing elements; and
   summing said number of local tasks associated with each of said plurality of processing elements with said number of local tasks associated with each other of said plurality of processing elements.

3. The method of claim 1 wherein said determining said total number of tasks present within said loop includes solving the equation $$V = \sum_{i=0}^{i=N-1} v_i,$$

where N represents the number of said processing elements in said loop and $v_i$ represents said local number of tasks associated with an $i^{th}$ processing element in said loop.

4. The method of claim 1 wherein said calculating a local mean number of tasks within each of said plurality of processing elements includes solving the equation $M_r=\text{Trunc}((V+E_r)/N)$, where $M_r$ is said local mean for said $PE_r$, N is the total number of said processing elements in said loop, and $E_r$ is a number in the range of 0 to (N−1), V is the total number of task, and wherein each processing element has a different $E_r$ value.

5. The method of claim 4 wherein said Trunc function is responsive to the value of $E_r$ such that said total number of tasks for said loop is equal to the sum of the local mean number of tasks for each of said plurality of processing elements in said loop.

6. The method of claim 4 wherein said local mean $M_r=\text{Trunc}((V+E_r)/N)$ for each local $PE_r$ within said loop is equal to one of X and (X+1), where X represents said local mean.

7. The method of claim 1 wherein said calculating a local deviation within each of said plurality of processing elements comprises finding the difference between said local number of tasks for each of said plurality of processing elements and said local mean number for each of said plurality of processing elements.

8. The method of claim 1 wherein said determining a running partial deviation sum for each of said plurality of processing elements comprises:
   transmitting said local deviation associated with each of said plurality of processing elements to another of said plurality of processing elements within said loop;
   receiving within each of said plurality of processing elements said local deviation associated with at least one other of said plurality of processing elements;
   summing within each of said plurality of processing elements said local deviation and said received local deviation; and
   repeating said transmitting, receiving, and summing a predetermined number of times.

9. The method of claim 1 wherein said determining a running partial deviation sum for each of said plurality of processing elements comprises solving the equation $$S_j = \sum_{i=0}^{i=j} D_i,$$

where $S_j$ represents said running partial deviation sum, $D_i$ represents the local deviation associated with the $i^{th}$ processing element, and j≠(N−1) where N is the number of processing elements on said loop.

10. The method of claim 1 wherein said determining a clockwise transfer parameter and an anti-clockwise transfer parameter within each of said processing elements comprises:
   setting $T_a=(H_r+L_r)\div 2$; and
   setting $T_c=D-T_a$ where $H_r$ represents a highest extrema of said running partial deviation sum; $L_r$ represents a lowest extrema of said running partial deviation sum, D represents the local deviation of a selected local processing element; and $T_c$ represents said clockwise transfer parameter, and $T_a$ represents said anti-clockwise transfer parameter.

11. A method for reassigning tasks associated with a selected processing element within a parallel processing system having a plurality of processing elements connected in a loop, each of said plurality of processing elements having a local number of tasks associated therewith, the method comprising:

determining the total number of tasks on said loop;

computing a local mean value for said selected processing element;

computing a local deviation for said selected processing element, said local deviation representative of the difference between said local number of tasks for said selected processing element and said local mean value for said selected processing element;

determining a running partial deviation sum for said selected processing element using said local deviation;

computing a number of tasks to transfer in a clockwise direction for said selected processing element from said running partial deviation sum;

computing a number of tasks to transfer in an anti-clockwise direction for said selected processing element from said running partial deviation sum; and reassigning said tasks associated with said selected processing element relative to the said number of tasks to transfer in a clockwise direction and said number of task to transfer in an anti-clotkwise direction.

12. The method of claim 11 wherein said determining the total number of tasks on said loop, comprises:

receiving within said selected processing element said number of local tasks associated with said each other of said plurality of processing elements; and summing said number of local tasks associated with said selected processing element and said number of local tasks associated with each other of said plurality of processing elements.

13. The method of claim 11 wherein computing a local mean value for a selected processing element includes solving the equation $M_r=\text{Trunc}((V+E_r)/N)$, where $M_r$ represents said local mean for a $PE_r$, N represents the total number of processing elements in said loop, V is the total number of tasks, and $E_r$ is a number in the range of 0 to (N−1).

14. The method of claim 13 wherein said Trunc function is responsive to the value of $E_r$ such that said total number of tasks for said loop is equal to the sum of the local mean number of tasks for each of said plurality of processing elements in said loop and wherein each processing element has a different $E_r$ value assigned.

15. The method of claim 11 wherein said determining a running partial deviation sum for said selected processing element comprises:

receiving within said selected processing element a local deviation associated with an adjacent one of said plurality of processing elements; and summing said local deviation associated with said selected processing element and said local deviation associated with at least one other of said plurality of processing elements.

16. The method of claim 11 wherein said determining a running partial deviation sum for said selected processing element comprises solving the equation $$S_j = \sum_{i=0}^{i=j} D_i,$$

where $S_j$ represents said running partial deviation sum, $D_i$ represents the local deviation associated with an $i^{th}$ processing element, and $j \neq (N-1)$ where N is the number of said plurality of processing elements on said loop.

17. The method of claim 11 wherein said computing a local mean value, said computing a local deviation, said determining a running partial deviation sum, computing a number of tasks to transfer in a clockwise direction, computing a number of tasks to transfer in an anti-clockwise direction, and said reassigning tasks relative to the said number of task to transfer in a clockwise direction and said number of tasks to transfer in an anti-clockwise direction are completed simultaneously for each of said plurality of processing elements within said loop.

18. The method of claim 11 wherein said computing a number of tasks to transfer in a clockwise direction for said selected processing element includes evaluating at least one of a maximum extrema and a minimum extrema of said running partial deviation sum.

19. The method of claim 11 wherein said computing a number of tasks to transfer in an anti-clockwise direction for said selected processing element includes evaluating at least one of a maximum extrema and a minimum extrema of said running partial deviation sum.

20. A memory device carrying a set of instructions which, when executed, perform a method comprising:

determining a total number of tasks present within a plurality of orocessing elements connected in a loop;

calculating a local mean number of tasks for each of said plurality of processing elements;

calculating a local deviation from said local mean number for each of said plurality of processing elements;

determining a running partial deviation sum for each of said plurality of processing elements using said local deviation;

determining a clockwise transfer parameter and an anti-clockwise transfer parameter for each of said plurality of processing elements from said running partial deviation sums; and redistributing tasks among said plurality of processing elements using said clockwise transfer parameter and said anti-clockwise parameter for each of said plurality of processing elements.

* * * * *

UNITED STATES PATENT AND TRADEMARK OFFICE
CERTIFICATE OF CORRECTION

| | | |
|---|---|---|
| PATENT NO. | : 7,373,645 B2 | Page 1 of 1 |
| APPLICATION NO. | : 10/689312 | |
| DATED | : May 13, 2008 | |
| INVENTOR(S) | : Beaumont | |

It is certified that error appears in the above-identified patent and that said Letters Patent is hereby corrected as shown below:

In column 12, line 16, in Claim 4, delete "task," and insert -- tasks, --, therefor.

In column 12, line 25, in Claim 6, delete "one of X and" and insert -- either X or --, therefor.

In column 12, line 38, in Claim 8, delete "another" and insert -- an adjacent one --, therefor.

In column 13, line 31, in Claim 11, delete "-clotkwise" and insert -- -clockwise --, therefor.

In column 14, line 38, in Claim 20, after "A" insert -- computer readable --.

In column 14, line 41, in Claim 20, delete "orocessing" and insert -- processing --, therefor.

Signed and Sealed this

Twenty-sixth Day of August, 2008

JON W. DUDAS
*Director of the United States Patent and Trademark Office*